(12) United States Patent
Jeong et al.

(10) Patent No.: US 9,952,621 B2
(45) Date of Patent: *Apr. 24, 2018

(54) DISPLAY APPARATUS

(75) Inventors: Hyun-chul Jeong, Asan-si (KR);
Jae-hwan Chun, Suwon-si (KR);
Jong-ho Won, Suwon-si (KR);
Sung-won Chung, Cheonan-si (KR);
Jung-ki Kim, Suwon-si (KR);
Sung-Sun Han, Cheonan-si (KR);
Yu-kwan Kim, Incheon (KR);
Jeong-Ki Kim, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/082,429

(22) Filed: Apr. 8, 2011

(65) Prior Publication Data

US 2011/0187961 A1   Aug. 4, 2011

Related U.S. Application Data

(63) Continuation of application No. 11/931,225, filed on Oct. 31, 2007, now Pat. No. 7,936,413.

(30) Foreign Application Priority Data

Dec. 4, 2006  (KR) .................. 10-2006-0121285

(51) Int. Cl.
*G02F 1/1333*   (2006.01)
*G06F 1/16*     (2006.01)
(Continued)

(52) U.S. Cl.
CPC ........... *G06F 1/1601* (2013.01); *H04N 5/645* (2013.01)

(58) Field of Classification Search
CPC ......... G02F 1/133308; G02F 1/133322; G02F 2201/503; G02F 2201/54
See application file for complete search history.

(56) References Cited

U.S. PATENT DOCUMENTS 5,299,017 A  *  3/1994  Furuno .................. 348/786
6,256,075 B1 *  7/2001  Yang ..................... 348/843
(Continued)

FOREIGN PATENT DOCUMENTS

CN    1639619 A    7/2005
CN    1674997 A    9/2005
(Continued)

OTHER PUBLICATIONS

Search Report of TW patent application No. 103111447 dated May 18, 2016.

*Primary Examiner* — Jerry M Blevins
*Assistant Examiner* — Erin Chiem
(74) *Attorney, Agent, or Firm* — Cantor Colburn LLP

(57) ABSTRACT

A display apparatus includes a display module and a front case. The display module displays images. The display module includes a boss fixing member having a combination hole. The front case covers a first surface of the display module and has a first boss that is inserted into the combination hole to combine the front case to the display module. The first boss is formed at inside edges of the display module. The boss fixing member is positioned within the edges of the display module which define the outdimension of the display module.

11 Claims, 7 Drawing Sheets

(51) Int. Cl.
*H05K 5/00* (2006.01)
*H05K 7/00* (2006.01)
*H04N 5/645* (2006.01)

(56) References Cited

U.S. PATENT DOCUMENTS

| | | | |
|---|---|---|---|
| 6,468,457 | B2 | 10/2002 | Corrion et al. |
| 6,532,152 | B1 | 3/2003 | White et al. |
| 7,118,265 | B2 * | 10/2006 | Cho ............................. 362/606 |
| 7,426,106 | B2 * | 9/2008 | Nakagawa et al. ...... 361/679.27 |
| 7,699,766 | B2 * | 4/2010 | Ellsworth et al. ............... 494/20 |
| 2002/0002081 | A1 * | 1/2002 | Albert ............................ 473/61 |
| 2002/0054249 | A1 | 5/2002 | Ryu et al. |
| 2004/0089749 | A1 * | 5/2004 | Bugarin ........................ 239/569 |
| 2004/0248619 | A1 * | 12/2004 | Graiger et al. ............... 455/566 |
| 2006/0268239 | A1 | 11/2006 | Nasu et al. |
| 2007/0019275 | A1 * | 1/2007 | Okuda .......................... 359/265 |
| 2007/0058299 | A1 * | 3/2007 | Cho ........................... 360/265.1 |
| 2007/0267554 | A1 * | 11/2007 | Tannas, Jr. ................. 248/205.1 |
| 2008/0024388 | A1 | 1/2008 | Bruce |

FOREIGN PATENT DOCUMENTS

| | | | |
|---|---|---|---|
| CN | 1226657 C | 11/2005 | |
| EP | 1382991 A2 * | 1/2004 | ............... G02F 1/13 |
| JP | 05-083346 A | 4/1993 | |
| JP | 06-295927 A | 10/1994 | |
| JP | 11190835 A | 7/1999 | |
| JP | 2003-195781 A | 7/2003 | |
| KR | 1020010036435 A | 5/2001 | |
| TW | M278946 | 10/2005 | |
| WO | 2004015490 A1 | 2/2004 | |
| WO | WO 2004015490 A1 * | 2/2004 | |

* cited by examiner

DISPLAY APPARATUS

CROSS REFERENCE TO RELATED APPLICATIONS

This application is a continuation application of U.S. application Ser. No. 11/931,225 filed Oct. 31, 2007, which claims priority to Korean Patent Application No. 2006-0121285, filed on Dec. 4, 2006 and all the benefits accruing therefrom under 35 U.S.C. § 119, the contents of which are herein incorporated by reference in its entirety.

BACKGROUND OF THE INVENTION

1. Field of the Invention

The present invention relates to a display apparatus. More particularly, the present invention relates to a display apparatus capable of decreasing the overall size thereof.

2. Description of the Related Art

A liquid crystal display apparatus ("LCD") includes a backlight assembly providing light and an LCD panel displaying images using the light.

The LCD apparatus is widely used because it has relatively small size and is light weight, and is driven by relatively low power consumption and driving voltage. Particularly, the LCD apparatus is becoming more widely used for large-sized electronic devices, such as televisions.

The LCD apparatus used for large-sized electronic devices is covered by front and rear cases including plastic material, to protect it from external impact and to provide visual appeal. An outside surface of the LCD apparatus is generally covered by a chassis that is made of a metal material.

A bracket is employed at edges of the LCD apparatus to combine its front and rear cases together. In particular, first and second bosses are formed on the bracket in the front and rear cases of the LCD apparatus, and then the front and rear cases are combined using the bracket. The bracket includes the metal material to have the same thermal expansion as that of the chassis. The first and second bosses are integrally formed with the front and rear cases, so they are formed of plastic material.

However, the above-mentioned configuration adds to overall size of the display apparatus due to the bracket. In addition, when the first and second bosses are formed from different materials than those of the bracket, thermal expansions of the bosses are different from those of the bracket, so that the bosses and the bracket may come in contact resulting in noise.

BRIEF SUMMARY OF THE INVENTION

The present invention provides a display apparatus having a boss fixing member to decrease the overall size of the display apparatus.

In an exemplary display apparatus according to the present invention, the display apparatus includes a display module and a front case. The display module displays images. The display module includes a boss fixing member having a combination hole. The front case covers a first surface of the display module and has a first boss that is inserted into the combination hole to combine the front case to the display module. The first boss is formed at inside edges of the display module. The boss fixing member is positioned within the edges of the display module which define the outdimension of the display module.

The display apparatus further includes a rear case covering a second surface of the display module opposite to the first surface thereof, and having a second boss that is formed to a corresponding location of the first boss and is inserted into the combination hole.

The boss fixing member is formed at corners of the display module.

The display apparatus further includes a boss insertion element surrounding inner part of the combination hole of the boss fixing member. The boss insertion element includes an elastic material. For example, the boss insertion element includes rubber.

The boss insertion element includes a combining portion and the boss fixing element includes a hook portion. The hook portion fixes the boss insertion element via the combining portion.

The combination hole has a shape corresponding to cross-sectional shapes of the first and second bosses. Each of the first and second bosses may have a conical shape, and the combination hole may have a circular shape.

The boss fixing member includes a protrusion portion formed in an inside surface of the combination hole. The protrusion portion may have a hemispherical shape.

The first and second bosses may be combined with each other in the combination hole. The boss fixing member may be formed at an outer end of a side of the display module.

The combination hole may include a first combination hole to receive and fix the first boss and a second combination hole to receive and fix the second boss. A separation material may be disposed between the first and second combination holes.

According to the present invention, the display module includes the boss fixing member having the combination hole in which the first boss in the front case and the second boss in the rear case are flexibly inserted, so that the overall size of the display apparatus may be decreased and noise due to differences of heat expansions may be prevented.

BRIEF DESCRIPTION OF THE DRAWINGS

The above and other aspects, features, and advantages of the present invention will become more apparent by describing in detail exemplary embodiments thereof with reference to the accompanying drawings, in which.

DETAILED DESCRIPTION OF THE INVENTION

Figure 1:
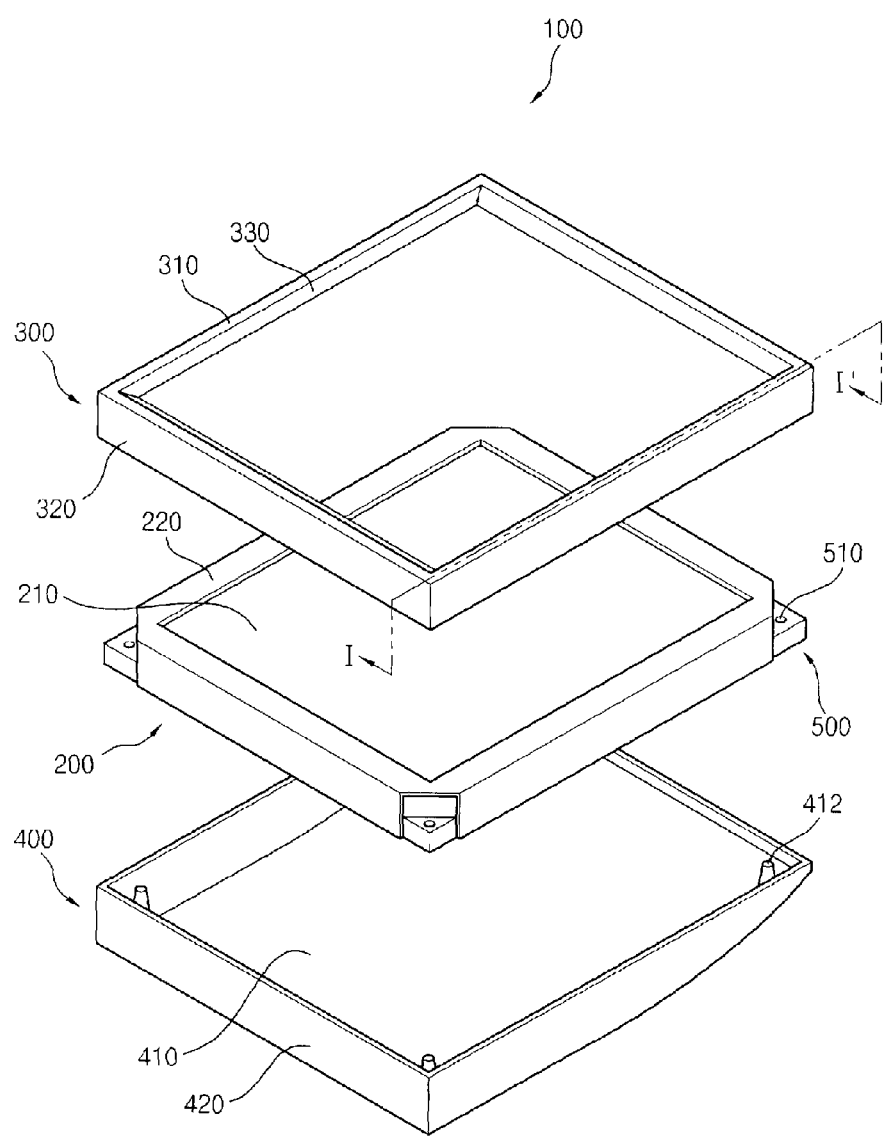
FIG. 1 is an exploded perspective view illustrating a display apparatus according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized embodiments (and intermediate structures) of the invention. As such, variations from the shapes of the illustrations as a result, for example, of manufacturing techniques and/or tolerances, are to be expected. Thus, exemplary embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
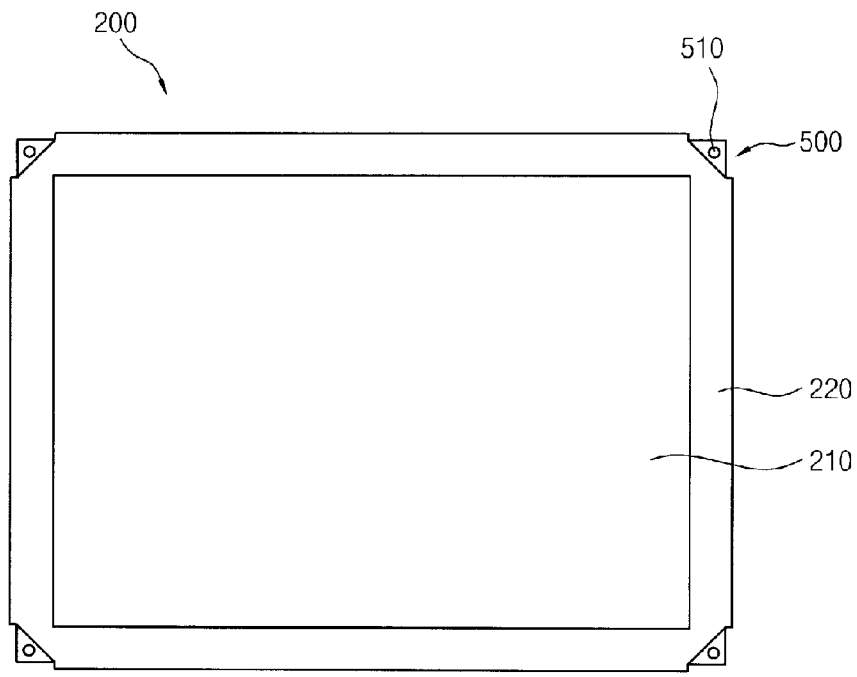
FIG. 2 is a plan view illustrating a display module shown in FIG. 1.
Figure 3:
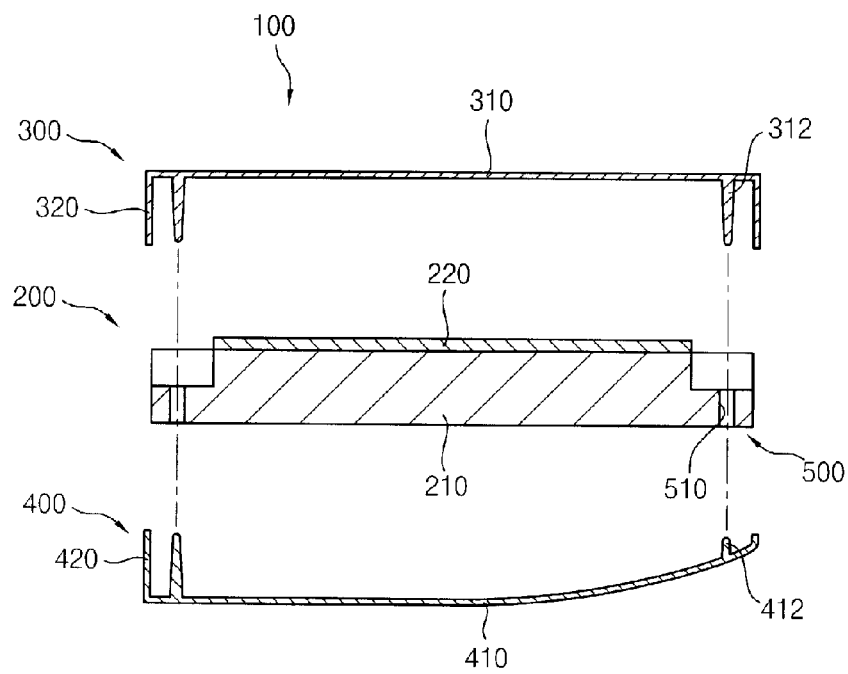
FIG. 3 is a cross-sectional view of the display apparatus of FIG. 1, taken along a line I-I'.

FIG. 1 is an exploded perspective view illustrating a display apparatus 100 according to an exemplary embodiment of the present invention. FIG. 2 is a plan view illustrating a display module 200 shown in FIG. 1. FIG. 3 is a cross-sectional view of the display apparatus of FIG. 1, taken along a line I-I'.

Referring to FIGS. 1, 2 and 3, the display apparatus 100 according to the present exemplary embodiment includes the display module 200, a front case 300 and a rear case 400.

The display module 200 includes a display unit 210 displaying an image and a cover chassis 220 covering a peripheral area of the display unit 210. The display unit 210 is divided into a display area and the peripheral area covered by the chassis 220. The image is displayed in the display area.

In an exemplary embodiment, the cover chassis 220 includes a metal material having thermal expansion and thermal contraction rates lower than that of a plastic material, for example. The cover chassis 220 is opened to correspond to the display area of the display unit 210. As shown in FIG. 1, the cover chassis 220 covers the peripheral area.

The display module 200 may be a liquid crystal display ("LCD") apparatus displaying an image by using a liquid crystal. The LCD apparatus includes an LCD panel displaying the image and a backlight assembly (not shown) providing light to the LCD panel. The LCD panel includes two substrates (not shown) and a liquid crystal layer (not shown) disposed between the two substrates. Alternatively, the display module 200 may include an organic light emitting display ("OLED") apparatus displaying the image using an organic light-emitting element or a plasma display apparatus displaying the image using plasma.

Upon assembly, the front case 300 covers a first surface of the display module 200. For example, when the display module 200 is the LCD apparatus, the front case 300 may cover an upper surface of the LCD panel. The front case 300 includes a front cover portion 310 disposed substantially parallel with the first surface of the display module 200, and a front extension portion 320 extended downward from a first edge of the front cover portion 310 to collectively cover the display module 200. The front extension portion 320 may be formed to extend perpendicular to the front cover portion 310.

In an exemplary embodiment, the front case 300 has a substantially rectilinear frame shape. The front cover portion 310 of the front case 300 is substantially opened to correspond to the display area of the display unit 210, so that the image displayed by the display module 200 is exposed to the outside. The front cover portion 310 may cover only an upper surface of the cover chassis 220. Alternatively, the front cover portion 310 may include a transparent material corresponding to the display area.

The front case 300 may further include a front curved portion 330 diagonally extending from a second edge of the front cover portion 310 corresponding to an inner side of the front cover portion 310 and toward the display unit 210. The front curved portion 330 prevents foreign material from entering into the display module 200. Additionally, the front curved portion 330 may further include a gasket (not shown) having a sealing material in an end portion of the front curved portion 330. Alternatively, the front case 300 may include a gasket in lieu of the front curved portion 330.

The front case 300 includes a first boss 312 disposed, e.g., at a corner thereof. In an exemplary embodiment, the first boss 312 is protruded from a lower surface of the front cover portion 310 of the front case 300. The first boss 312 may have a tapered shape in which a diameter of the first boss 312 becomes smaller as a distance from the front cover portion 310 is increased. For example, the first boss 312 may have a conical shape. Alternatively, the first boss 312 may have a poly-prism shape.

For example, the first boss 312 has a diameter of about 12 mm at a contacting portion with the front cover portion 310, and has a diameter of about 8 mm at a portion farthest away from the front cover portion 310.

The first boss 312 may have the above-mentioned shape so that the first boss 312 is more easily inserted into a combination hole 510 as will be explained further herein. The first boss 312 may be integrally formed with the front cover portion 310. Alternatively, the first boss 312 and the front cover portion 310 may be separately formed, and then combined with each other. In this latter embodiment, a combining element such as a bolt, an adhesive, etc., may be used to combine the first boss 312 and the front case 300. In an exemplary embodiment, the front case 300 is formed from plastic material having thermal expansion and thermal contraction rates higher than those of a metal material.

The rear case 400 covers a second surface of the display module 200 that is opposite to the first surface of the display module 200, which first surface is covered by the front case 300. The rear case 400 includes a rear cover portion 410 directly covering the second surface of the display module 200, and a rear extension portion 420 extending upwardly from an edge portion of the rear cover portion 410 to be combined with the front extension portion 320 of the front case 300. The rear extension portion 420 may be formed to be substantially perpendicular to the rear cover portion 410. The rear case 400 substantially has a shape to receive the display module 200.

When the display apparatus 100 according to the present exemplary embodiment is used in an upright position, one of the rear extension portions 420 may be longer than others of the rear extension portions 420 to enhance stability. In addition, the rear cover portion 410 and/or or one or more of the rear extension portions 420 of the rear case 400 may have a curved shape to provide enhanced visual appeal.

In an exemplary embodiment, a second boss 412 is formed at corners of the rear cover portion 410 of the rear case 400. In particular, the second bosses 412 are formed on an upper surface of the rear cover portion extending in a direction toward the display module 200. In addition, the second bosses 412 may be formed in a location on the rear cover portion 410 that is a corresponding location in which the boss fixing members 500 and first bosses 312 are formed. The second boss 412 may be formed longer than the first boss 312 so that a control main board controlling the display module 200 and electronic devices for enhancing a user's experience are mounted on the rear surface of the display module 200, thereby requiring additional space. The second boss 412 may have the same characteristics as those of the first boss 312, and thus any further repetitive explanation concerning the second boss 412 will be omitted.

The display module 200 has a boss fixing member 500 disposed at a corresponding location of the first and second bosses 312 and 412. For example, the boss fixing member 500 may be disposed at corners of the display module 200. In an exemplary embodiment, the boss fixing member 500 is formed at outer edges of the display module 200. The boss fixing member 500 may be formed by removing a portion of the display module 200 at its corner edges. As shown in FIG. 1, corners of the display module 200 are removed at substantially 45 degree angles except for a base portion thereof to provide the boss fixing member 500. Alternatively, the boss fixing member 500 may be separately manufactured and then combined with the display module 200.

When the display module 200 is a liquid crystal display apparatus, the boss fixing member 500 may be formed by changing a shape of a mold frame of the backlight assembly in the LCD apparatus. The cover chassis 220 may have a structure in which a portion of an edge of the cover chassis 220 is cut away to expose the boss fixing member 500 to the outside.

The boss fixing member 500 simultaneously fixes the first and second bosses 312 and 412 with respect to the front case 300 and the rear case 400. The boss fixing member 500 is formed at inside portions of the corners of the display module 200, and without the use of a bracket, thereby reducing an overall size thereof.

The combination hole 510 into which the first and second bosses 312 and 412 are inserted, is formed in the boss fixing member 500. In an exemplary embodiment, the boss fixing member 500 includes an elastic material around the combination hole 510. Thus, the boss fixing member 500 may be flexibly adjusted in accordance with heat expansion of the first and second bosses 312 and 412. Alternatively, the entire boss fixing member 500 may include the elastic material.

Since the first and second bosses 312 and 412 generally have tapered outer diameters between about 8 mm to about 12 mm, the combination hole 510 has corresponding an inner diameter to accommodate the first and second bosses 312 and 412. For example, the inner diameter of the combination hole 510 may be between about 8.5 mm to about 10 mm. In addition, the combination hole 510 may have an elongated shape corresponding to lengths and shapes of respective first and second bosses 312 and 412. Additionally, the box combination hole 510 may have a circular shape when viewed from a plan view layout.

In an exemplary embodiment, the boss fixing member 500 has a predetermined thickness to accommodate and simultaneously fix the first and second bosses 312 and 412, regardless of the thickness of the display module 200. However, the boss fixing member 500 may have thinner thickness to guide the combination of the first or second boss 312 or 412 with the boss fixing member 500. According to the exemplary embodiments shown in FIGS. 1 to 3, the thickness of boss fixing member 500 may have about half the thickness of the display module 200.

In alternative embodiments, predetermined combination holes such as a hook may be formed in the front extension portion 320 of the front case and the rear extension portion 420 of the rear case 400 in lieu of the boss fixing member 500, so that the front and rear cases 300 and 400 may be aligned and combined with each other.

As indicated above, the display apparatus 100 according to the present exemplary embodiment includes the boss fixing member 500 formed at corners of the display module 200, and the boss fixing member 500 includes the combination hole 510 through which the first boss 312 formed in the front case 300 and the second boss 412 formed in the rear case 400 are flexibly combined with each other, so that noise and cracks due to differences in heat expansion and contraction rates, when the first and second bosses 312 and 412 are fixed by using a conventional bracket having the metal material, may be prevented. In addition, the overall size of the display apparatus 100 may be decreased by eliminating the conventional bracket.

Figure 4:
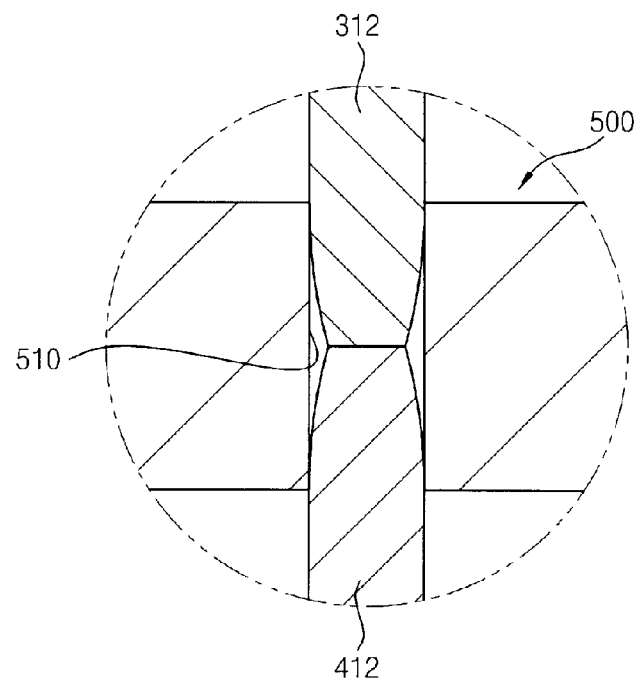
FIG. 4 is an enlarged view illustrating an exemplary embodiment of a combination between first and second bosses shown in FIG. 3.

FIG. 4 is an enlarged view illustrating an exemplary embodiment of a combination between first and second bosses shown in FIG. 3.

Referring to FIGS. 3 and 4, the first boss 312 in the front case 300 and the second boss 412 in the rear case 400 are combined with each other in the combination hole 510.

In one exemplary embodiment, the combination hole 510 may be formed in one of the first and second bosses 312 and 412, so that the other first and second bosses 312 and 412 may be combined in the combination hole 510. Alternatively, a push-type hook may be formed in one of the first and second bosses 312 and 412, and a combination groove combined with the hook may be formed in the other first and second bosses 312 and 412. Alternatively, magnets may be combined at end portions of the first and second bosses 312 and 412 that face each other.

Advantageously, the front and rear cases 300 and 400 are independently combined with each other regardless of the display module 200, so that the front and rear cases 300 and 400 may be easily controlled.

Figure 5:
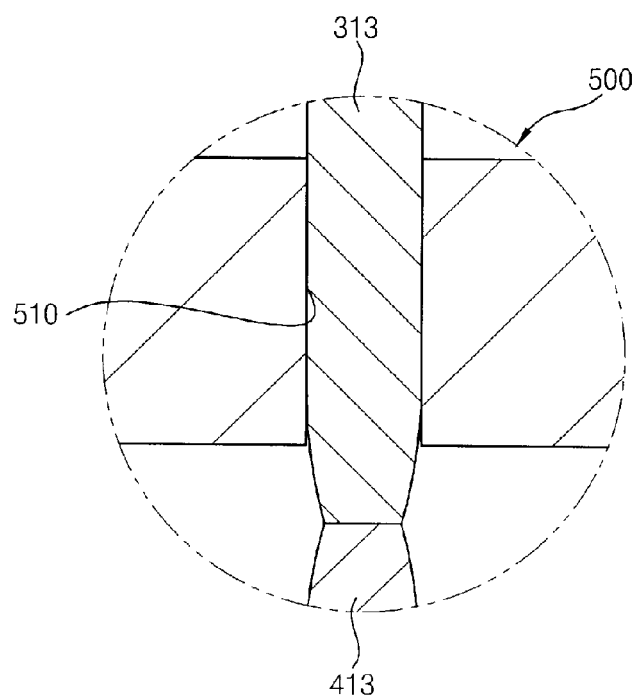
FIG. 5 is an enlarged view illustrating another exemplary embodiment of a combination between first and second bosses shown in FIG. 3.

FIG. 5 is an enlarged view illustrating another exemplary embodiment of a combination between first and second bosses shown in FIG. 3.

Referring to FIG. 5, a first boss 313 and a second boss 413 are combined with each other at the outside of the combination hole 510.

For example, the first boss 313 passes completely through the combination hole 510, and then is combined with the second boss 413. Alternatively, the second boss 413 may pass completely through the combination hole 510, and may then be combined with the first boss 313.

Advantageously, the first and second bosses 313 and 413 are combined with each other at the outside of the combination hole 510, so that the combination between the first and second bosses 313 and 413 may be visually inspected.

Figure 6:
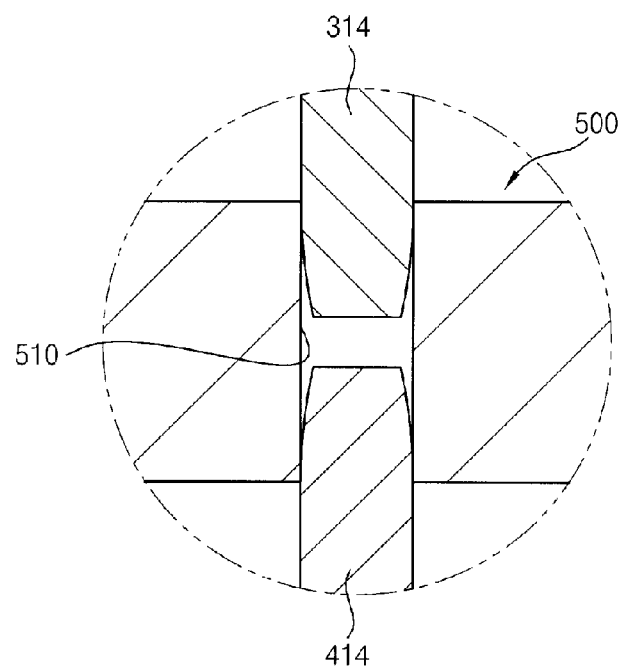
FIG. 6 is an enlarged view illustrating still another exemplary embodiment of a combination between first and second bosses shown in FIG. 3.

FIG. 6 is an enlarged view illustrating still another exemplary embodiment of a combination between first and second bosses shown in FIG. 3.

Referring to FIG. 6, a first boss 314 is separated from a second boss 414 when the front case 300 is combined with the rear case 400.

For example, a predetermined space is formed between the first and second bosses 314 and 414. The first and second bosses 314 and 414 may be fixed only by the boss fixing member 500 (e.g., via friction induced by the box fixing member 500). In other words, the front and rear cases 300 and 400 in FIG. 3 stably fixed to the display module 200.

Since the first boss 314 is separated from the second boss 414, although the first and second bosses 314 and 414 are expanded by the heat expansions of the first and second bosses 314 and 414, cracks formed due to the heat expansions may be prevented. In addition, costs for manufacturing the first and second bosses 314 and 414 may be decreased.

Figure 7:
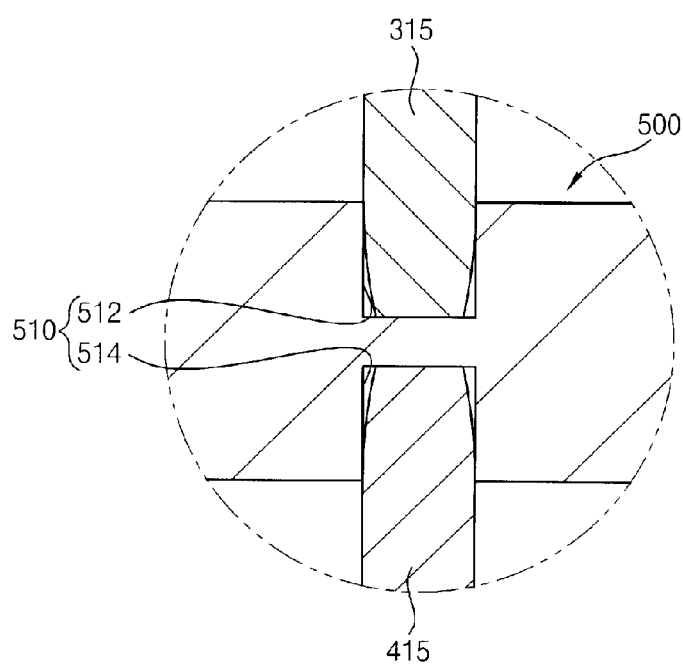
FIG. 7 is an enlarged view illustrating still another exemplary embodiment of a combination between first and second bosses shown in FIG. 3.

FIG. 7 is an enlarged view illustrating still another exemplary embodiment of a combination between first and second bosses shown in FIG. 3.

Referring to FIG. 7, a first boss 315 is separated from a second boss 415, and a portion of the boss fixing member 500 is changed to complete a distance between the first and second bosses 315 and 415 when combined.

The boss fixing member 500 includes the elastic material to correspond to the heat expansions of the first and second bosses 315 and 415. For example, the boss fixing member 500 may include a rubber material. Accordingly, the combination hole 510 may be divided into a first combination hole 512 into which the first boss 315 is inserted and a second combination hole 514 into which the second boss 415 is inserted and a material is disposed between the first and second combination holes 512 and 514, respectively.

For example, when the boss fixing member 500 is formed through changing the shape of the mold frame of the display module 200 in FIG. 1, the gap between the first and second bosses 315 and 415 may be filled with the mold frame.

The gap between the first and second bosses 315 and 415 may be filled to prevent movement of the first and second bosses 315 and 415, which may result when the first and second bosses 315 and 415 are combined while lacking contact with each other.

Figure 8:
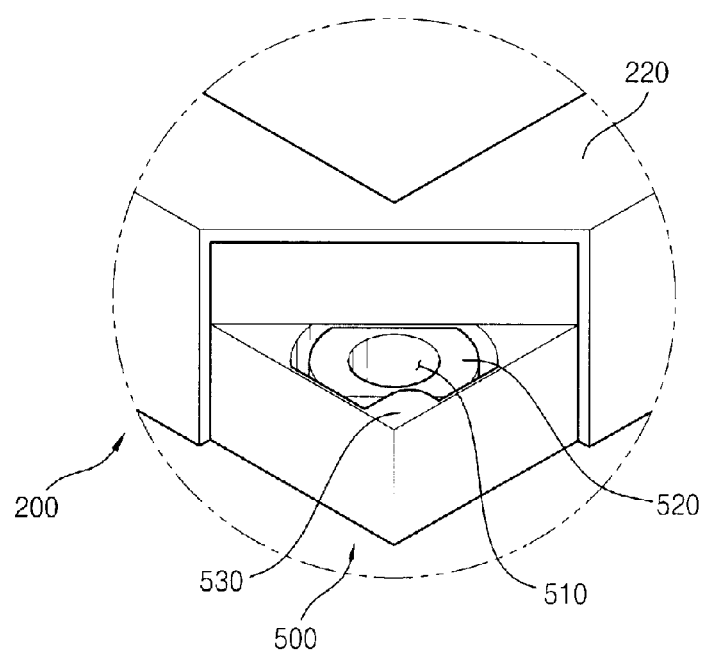
FIG. 8 is a perspective view illustrating a boss fixing member shown in FIG. 3.
Figure 9:
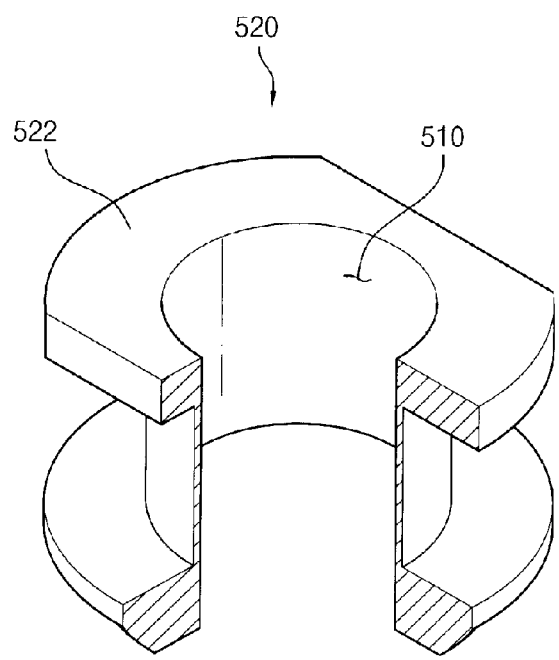
FIG. 9 is a perspective view illustrating an exemplary embodiment of a boss insertion element shown in FIG. 8.

FIG. 8 is a perspective view illustrating a boss fixing element shown in FIG. 3. FIG. 9 is a perspective view illustrating an exemplary embodiment of a boss insertion element shown in FIG. 8.

Referring to FIGS. 3, 8 and 9, the boss fixing member 500 includes a boss insertion element 520 in which the combination hole 510 is formed.

The boss insertion element 520 is formed to be easily combined with and separated from the boss fixing member 500. The boss fixing member 500 may include a hook portion 530 to prevent the boss insertion element 520 from being freely separated from the boss fixing member 500. Accordingly, a combining portion 522 combined to correspond to the hook portion 530 may be formed in the boss insertion element 520.

The combination hole 510 passes through the center of the boss insertion element 520. The combination hole 510 has a shape corresponding to the cross-sectional shapes of the first and second bosses 312 and 412. The combination hole 510 has an elongated hole shape. An entrance of the combination hole 510 may be chamfered for the first and second bosses 312 and 412 to be smoothly inserted into the combination hole 510.

Alternatively, two combination holes 510 having a groove shape may be formed at the center of the boss insertion element 520. For example, a first combination hole 510 may be formed in a direction corresponding to the placement of the first boss 312, and a second combination hole 510 is formed in a direction corresponding to the placement of the second boss 412.

In addition, when the first and second bosses 312 and 412 have the tapered shapes, a tapered shape opposite to the first and second bosses 312 and 412 may be formed in an inside surface of the combination hole 510, to enhance combination force. For example, a cross-sectional diameter of the combination hole 510 at a location in which the first and second bosses 312 and 412 first penetrate, may be smaller than a diameter of the opposite end of the combination hole 510 (i.e., an inverse tapered shape). The combination hole 510 may have, e.g., a circular shape when viewed in a plan view layout.

In an exemplary embodiment, the boss insertion element 520 includes elastic material having good absorptive power. For example, the boss insertion element 520 may be formed of rubber material. Alternatively, the boss insertion element 520 may include foam resin having a plurality of pores. In addition, the boss insertion element 520 may include a silicone material having good oxidation resistance and durability. In addition, the boss insertion element 520 may include a viton material having good corrosion and wear resistance.

Advantageously, when the combination hole 510 is broken, only the combination insertion portion 520 of the boss fixing member 500 needs to be changed or repaired. Thus configured, the boss fixing member 500 including the boss insertion element 520 which has the combination hole 510 combined and separated from the boss fixing member 500, facilitates easy maintenance and repair and reduces manufacturing costs thereof.

In addition, although the outer diameters of the first and second bosses 312 and 412 may be changed, only the boss insertion element 520 having combination holes 510 manufactured differently needs to be changed, thereby enhancing workability.

Figure 10:
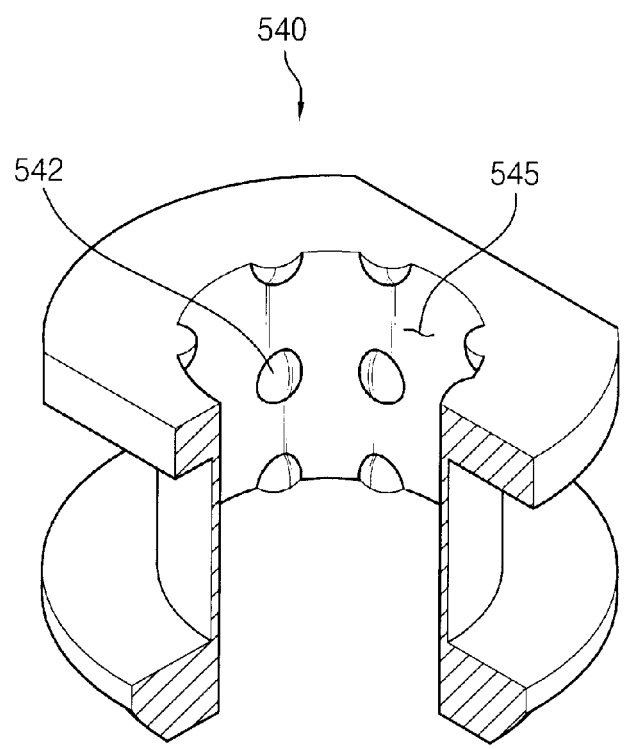
FIG. 10 is a perspective view illustrating another exemplary embodiment of a boss insertion element shown in FIG. 8.

FIG. 10 is a perspective view illustrating another exemplary embodiment of a boss insertion element shown in FIG. 8.

Referring to FIGS. 3 and 10, a boss insertion element 540 includes a combination hole 545, and a protrusion portion 542 formed on an inside surface of the combination hole 545. The protrusion portion 542 may also be formed at an entrance portion of the combination hole 545.

The protrusion portion 542 may be simultaneously formed with the boss insertion element 540. For example, the protrusion portion 542 may be formed of rubber material having good frictional force. The protrusion portion 542 may prevent the first and second bosses 312 and 412 from separating from the combination hole 545 due to frictional force provided by the protrusion portion 542, when the first and second bosses 312 and 412 are inserted into the combination hole 545.

The protrusion portion 542 may have, e.g., a rounded shape for the first and second bosses 312 and 412 to be smoothly inserted into. For example, the protrusion portion 542 may have a hemispheric shape. Alternatively, the protrusion portion 542 may have a rounded band shape along the inside surface of the combination hole 545. In addition, the protrusion portion 542 may include a protruded shape, for example, a center portion of the protrusion portion 542 is concaved and a peripheral portion of the center portion is roundly protruded.

Advantageously, the boss insertion element 540 includes the protrusion portion 542 having good frictional force formed therein, so that the first and second bosses 312 and 314 are prevented from falling out after being inserted into the combination hole 545. Thus, the combination force between the first and second bosses 312 and 412 and the boss fixing member 500 having the boss insertion element 540 may be enhanced.

Figure 11:
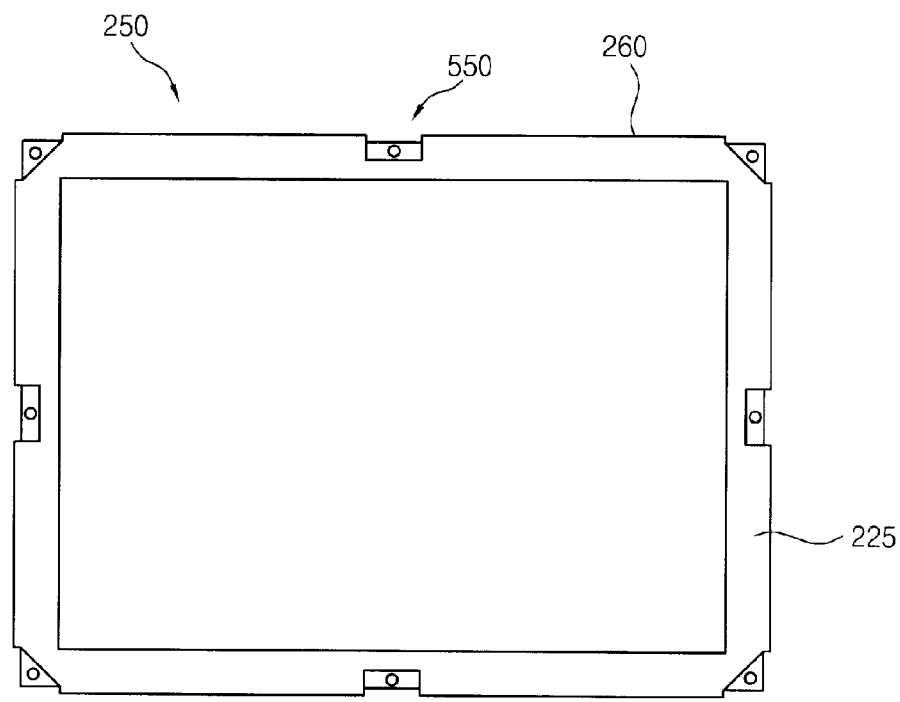
FIG. 11 is a plan view illustrating a display module of a display apparatus according to another exemplary embodiment of the present invention.
Figure 12:
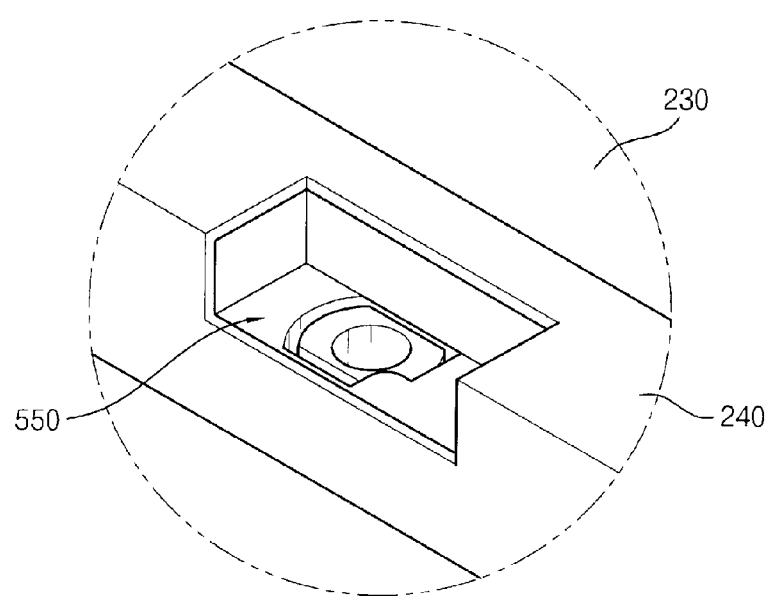
FIG. 12 is a perspective view illustrating a boss fixing member corresponding to a side region of the display module in FIG. 11.

FIG. 11 is a plan view illustrating a display module of a display apparatus according to another exemplary embodiment of the present invention. FIG. 12 is a perspective view illustrating a boss fixing member corresponding to an outer edge portion of the side of the display module in FIG. 11.

The display apparatus according to the present exemplary embodiment may be the same as in the display apparatus described in FIGS. 1 to 10, except an additional formation of a boss fixing member. Thus, the same reference numerals will be used to refer to the same or like parts as those described in FIGS. 1 to 10 and any further repetitive explanation concerning the above elements will be omitted.

Referring to FIGS. 11 and 12, a boss fixing member 550 formed in a display module 250 is formed at corners and outer edges of the sides 260 of the display module 250. Alternatively, the boss fixing member 550 may be formed at one of the corners and outer edges of the sides 260 of the display module 250.

The boss fixing member 550 corresponding to the corners has been already explained referring to FIGS. 1, 2 and 3, and thus any further repetitive explanation will be omitted. In addition, the boss fixing member 550 that will be explained is defined to correspond to the outer edges of the sides 260.

The side 260 includes a top surface 225 horizontally disposed and parallel with the front and rear cases 300 and 400 and a side portion extending vertically from an edge portion of the top surface 225 to form an L-shape. When the display module 250 is the LCD apparatus, one of the side portions of the side 260 may be relatively longer than another of the side portions of the display module 250. In an exemplary embodiment, the boss fixing member 550 is formed at the outer edge of the side 260 that has a relatively longer side portion. Thus configured, when lamps of the backlight assembly in the LCD apparatus are disposed along the relatively longer side, the space provided by the longer side portion accommodates the lamps.

A portion of a display unit 230 corresponding to the side 260 (e.g., at the top surface 225 and side portion) may be cut away at in a direction toward the inside of the display unit 230, and thus the boss fixing member 550 may have thinner thickness than that of the side 260 in which the boss fixing member 500 is formed. Accordingly, a portion of the cover chassis 240 that is a corresponding location of the boss fixing member 550 may be partially incised.

According to the present invention, the display apparatus includes the boss fixing member formed at the corners of the display module, and the boss fixing member includes the combination hole through which the first boss formed in the front case and the second boss formed in the rear case are flexibly combined with each other, so that the overall size of the display apparatus may be decreased by eliminating the conventional bracket.

In addition, when fixing the first and second bosses using the conventional bracket having the metal material, noise and cracks due to differences in heat expansion and contraction rates may be prevented.

Having described the exemplary embodiments of the present invention and its advantages, it is noted that various changes, substitutions and alterations may be made herein without departing from the spirit and scope of the invention as defined by appended claims.

What is claimed is:

1. A display module comprising:
   a display unit which provides an image to be displayed by the display module; and
   a cover member which receives the image provided from the display unit and through which the image is displayed by the display module,
   wherein
   the display unit which provides the image to the cover member defines a fixing portion of the display unit at which a hole is defined and into which a combination member is insertable, and
   in a top plan view, the cover member has a chamfered corner defined by a first outer line extending in a first direction, a second outer line extending in a second direction substantially perpendicular to the first direction, and a third outer line which is straight and extends in a third direction to meet the first and second outer lines, and
   the fixing portion, at which the hole is defined, protrudes from the third outer line of the cover member which receives the image from the display unit, such that the fixing portion and the hole defined thereby are entirely exposed by the cover member and such that the hole is spaced apart from the third outer line of the cover member in the top plan view.

2. The display module of claim 1, wherein the hole vertically passes through the display unit.

3. The display module of claim 1, wherein the hole is opened upwardly and/or downwardly.

4. The display module of claim 1, wherein
   the display unit further includes a fixing member disposed in the hole of the display unit, the fixing member including a different material from the display unit surrounding the fixing member, a portion of the fixing member defining a hole therein.

5. The display module of claim 4, wherein the fixing member includes at least one selected from rubber, phorous resin, silicon and viton.

6. The display module of claim 4, wherein the fixing portion has a hook portion which partially covers an upper surface of the fixing member.

7. The display module of claim 4, wherein the fixing member has a protrusion which laterally protrudes from an inner side surface of the fixing member, the inner side surface defining the hole of the fixing member.

8. The display module of claim 1, wherein the display unit has a substantially rectangular shape in the top plan view, and the fixing portion is disposed at at least one corner of the rectangular shape.

9. The display module of claim 1, wherein the display unit has a substantially rectangular shape in the top plan view, and the fixing portion is disposed between adjacent corners of the rectangular shape.

10. The display module of claim 1, wherein the cover member comprises:
    an upper portion extending in a direction substantially parallel to a display area of the display unit;
    a first side portion which extends vertically from the upper portion to face a first side surface of the display unit; and
    a second side portion which extends vertically from the upper portion to face a second side surface of the display unit,
    wherein a portion of the upper portion, a portion of the first side portion, and a portion of the second side portion are continuously incised.

11. The display module of claim 1, wherein a width of the cover member along a vertical direction is greater than a width of the fixing portion along the vertical direction.

* * * * *